(12) United States Patent
Hara et al.

(10) Patent No.: US 6,391,169 B1
(45) Date of Patent: May 21, 2002

(54) PRODUCTION SYSTEM OF ELECTROLYZED WATER

(75) Inventors: Yasuo Hara; Katsuhiro Asano, both of Shimane-ken (JP)

(73) Assignee: Hoshizaki Denki Kabushiki Kaisha, Toyotake (JP)

( * ) Notice: Subject to any disclaimer, the term of this patent is extended or adjusted under 35 U.S.C. 154(b) by 0 days.

(21) Appl. No.: 09/665,049

(22) Filed: Apr. 30, 2001

(51) Int. Cl.[7] .................................................. C25B 9/00
(52) U.S. Cl. ............................................................ 204/263
(58) Field of Search ............................................ 204/263

(56) References Cited

U.S. PATENT DOCUMENTS

| | | | | |
|---|---|---|---|---|
| 5,234,563 A | * | 8/1993 | Arai et al. ............... | 204/263 X |
| 5,445,722 A | * | 8/1995 | Yamaguti et al. ........ | 204/263 X |
| 5,614,068 A | * | 3/1997 | Kim ........................ | 204/263 X |
| 5,728,274 A | * | 3/1998 | Kamitani et al. ........ | 204/263 X |
| 5,798,028 A | * | 8/1998 | Tsuchikawa et al. .... | 204/263 X |
| 5,843,291 A | * | 12/1998 | Eki et al. ................. | 204/263 X |

* cited by examiner

*Primary Examiner*—Donald R. Valentine
(74) *Attorney, Agent, or Firm*—Arent Fox Kintner Plotkin & Kahn PLLC

(57) ABSTRACT

In a production system of electrolyzed water A, alkaline water and acid water produced in electrode chambers 12, 13 of an electrolyzer 10 are discharged through discharge conduits 41, 42 connected to the electrode chambers 12, 13 through a flow passage changeover valve 50. The discharge conduits 41, 42 are provided with manually operated faucets 43, 44 and 45, 46, respectively. When the faucets of either one of the discharge conduits 41 and 42 was opened, the electrolyzed water produced in the electrode chamber communicated with the discharge conduit opened at its faucets is discharged. Simultaneously, a drain valve provided on a drain conduit connected to the discharge conduit opened at its faucets is closed while a drain valve provided on a drain conduit connected to the discharge conduit closed at its faucets is intermittently opened.

5 Claims, 6 Drawing Sheets

PRODUCTION SYSTEM OF ELECTROLYZED WATER

BACKGROUND OF THE INVENTION

1. Field of the Invention

The present invention relates to a production system of electrolyzed water, which comprises an electrolyzer wherein acid water and alkaline water are produced by electrolysis of water or brine in a pair of electrode chambers subdivided by a cation permeable partition membrane. More particularly, the present invention relates to a production system of electrolyzed water in which both the alkaline water and acid water are simultaneously discharged or either one of the alkaline water or acid water is discharged for use in an appropriate manner.

2. Description of the Prior Art

In a conventional production system of electrolyzed water, the electrolyzer is continuously supplied with the water or brine through a water supply conduit and discharges the alkaline water and acid water therefrom through discharge conduits respectively connected to the electrode chambers. The discharge conduits each are provided with a manually operated faucet which is opened and closed by a user. When both the faucets of the discharge conduits are opened, both the alkaline water and acid water are simultaneously discharged through the discharge conduits. When either one of the faucets is opened, only either the alkaline water or the acid water is discharged.

In a condition where only the alkaline water or the acid water is being discharged from one of the electrode chambers, the supplied water or brine is retained in the other electrode chamber. In such an instance, an amount of gas is generated by electrolysis of the retained water or brine and is bubbled in the electrode chamber. This obstructs the flow of electric current applied to the electrode and affords bad influence to the quality of electrolyzed water. In addition, the pH of electrolyzed water becomes excessive or too small immediately after the water valve was opened to discharge the electrolyzed water. To avoid such a problem in the conventional production system, a drain valve is provided on a drain conduit bifurcated from the discharge conduit closed at its faucet to discharge therethrough useless electrolyzed water retained in the other electrode chamber. However, this results in an increase of useless consumption of treatment water relative to an amount of electrolyzed water for use.

SUMMARY OF THE INVENTION

It is, therefore, a primary object of the present invention to provide a production system of electrolyzed water capable of avoiding the problem caused by treatment water retained in the electrode chamber and of restraining the useless consumption of the electrolyzed water described above.

According to the present invention, the object is accomplished by providing a production system of electrolyzed water which includes an electrolyzer having a pair of electrode chambers subdivided by a partition membrane and supplied with treatment water from an external water supply source to continuously electrolyze the water for producing alkaline water and acid water; a pair of discharge conduits connected to the electrode chambers and provided with a faucet at their outlet ends respectively, a pair of drain conduits respectively bifurcated from the discharge conduits at upstream of the faucets and each provided with a drain valve to be opened and closed; and a control circuit including control means for closing the drain valve of the drain conduit bifurcated from the discharge conduit opened at its faucet when either one of the faucets or both the faucets was opened; wherein the control circuit includes determination means for determining whether or not either one of the faucets was opened while the other faucet is closed so that the electrolyzed water is discharged only through the discharge conduit opened at its faucet, and drain control means for intermittently opening and closing the drain valve of the drain conduit bifurcated from the discharge conduit closed at its faucet in a condition where the electrolyzed water is discharged only through said discharge conduit.

In a practical embodiment of the present invention, the drain control means is arranged to close the drain valve of the drain conduit bifurcated from the discharge conduit closed at its faucet until a first predetermined time lapses in a condition where the electrolyzed water is discharged only through said discharge conduit, to open the drain valve for a second predetermined time when the electrolyzed water is still discharged only through said discharge conduit during the first predetermined time, to close the drain valve for the first predetermined time upon lapse of the second predetermined time and to open the drain valve for the second predetermined time.

DESCRIPTION OF THE PREFERRED EMBODIMENT

Figure 1:
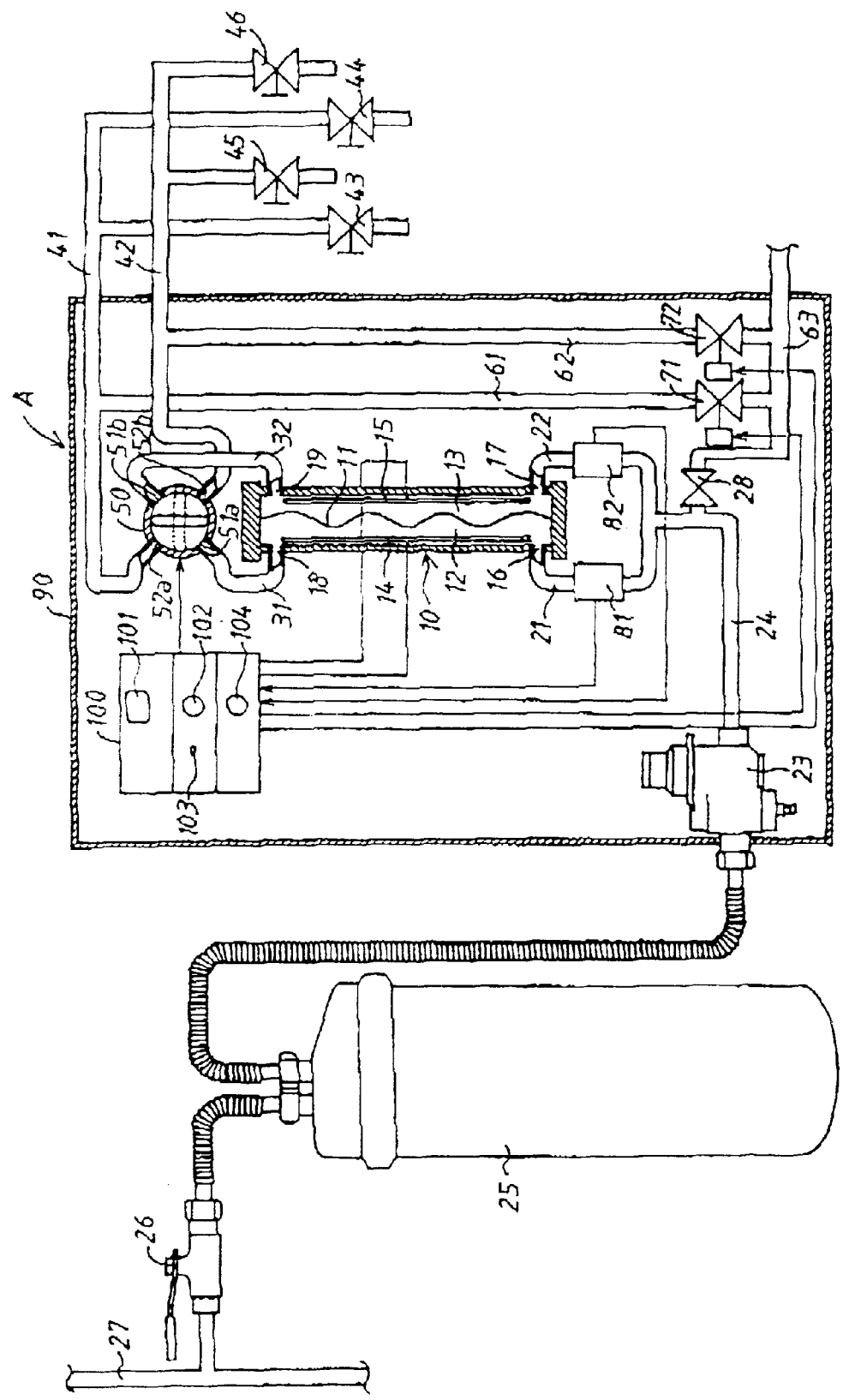
FIG. 1 is a schematic illustration of a preferred embodiment of a production system of electrolyzed water in accordance with the present invention.

Hereinafter, a preferred embodiment of the present invention will be described with reference to the drawings. A production system of electrolyzed water shown in FIG. 1 includes an electrolyzer 10, a pair of inlet conduits 21, 22, a pair of outlet conduits 31, 32, a pair of discharge conduits 41, 42, a flow passage changeover valve 50, a pair of drain conduits 61, 62, a pair of drain valves 71, 72., and an electric control device 100.

The electrolyzer 10 is installed in a housing 90 of the production system of electrolyzed water and is in the form of an electrolyzer of the flow-down type which includes a pair of electrodes 14, 15 provided in a pair of electrode chambers 12, 13 subdivided by a partition membrane 11. The electrodes 14, 15 are connected to the electric control device 100 to be selectively applied with positive and negative DC voltages under control of the control device. The electrolyzer 10 has inlet ports 16, 17 in connection with the inlet conduits 21, 22 and outlet ports 18, 19 in connection with the outlet conduits 31, 32. The inlet conduits 21, 22 are connected to a water supply conduit 24 to supply treatment water (city service water) into the electrode chambers 12, 13 of the electrolzyer 10, and the water supply conduit 24 is connected to a water purifier 25 through a pressure reduction valve 23 placed in the interior of housing 90 and is connected to a main drain conduit 63 through a safety valve 28 in the form of a relief valve.

The water purifier 25 is placed in the exterior of housing 90 and is connected to a city service water conduit 27 through a main cock 26.

To introduce alkaline water and acid water produced in the electrode chambers 12, 13 into the changeover valve 50, the outlet conduits 31, 32 are provided for connection of the outlet ports 18, 19 of electrolyzer 10 with first and second inlet ports 51a, 51b of the changeover valve 50. The discharge conduits 41, 42 are connected to first and second outlet ports 52a, 52b of the changeover valve 50 and extended outwardly from die housing 90 to introduce the alkaline water and acid water from the changeover valve 50 to an appropriate place for use. The discharge conduits 41, 42 are provided at their outlet ends with faucets 43, 44, 45, 46 which are manually operated to open and close the flow passages of discharge conduits 41, 42.

The flow passage changeover valve 50 is switched over to a first position shown by a solid line in FIG. 1 or a second position shown by an imaginary line in FIG. 1 by operation of an electric motor (not shown) under control of the control device 100 to selectively connect the outlet conduits 31, 32 to the discharge conduits 41, 42. Hereinafter, a condition where the changeover valve 50 is retained in its first position to connect the outlet conduits 31, 32 to the discharge conduits 41, 42 is referred to a first connecting condition, while a condition where the changeover valve 50 is retained in its second position to connect the outlet conduits 31, 32 to the discharge conduits 42, 41 is referred to a second connecting condition. In the production system a position sensor (not shown) is provided to detect the position of changeover valve 50, and the electric control device 100 is applied with a detection signal from the position sensor.

The drain conduits 61, 62 are bifurcated from the discharge conduits 41, 42 respectively between the changeover valve 50 and faucets 43, 44, 45, 46 in the interior of housing 90 and connected to the main drain conduit 63. The drain valves 71, 72 are provided on the drain conduits 61, 62 and each are in the form of a normally closed electromagnetic valve which is activated under control of the electric control device 100. The drain valves 71, 72 each are opened in response to a high level signal applied from the control device 100 and is closed in response to a low level signal applied from the control device 100. The flow quantity sensors 81, 82 are provided on the inlet conduits 21, 22 to be turned on when the quantity of water flowing through the inlet conduits becomes more than a predetermined value and closed when the quantity of water flowing through the inlet conduits becomes less than the predetermined value. The electric control device 100 is applied with a detection signal from the flow quantity sensor 81, 82.

Figure 2:
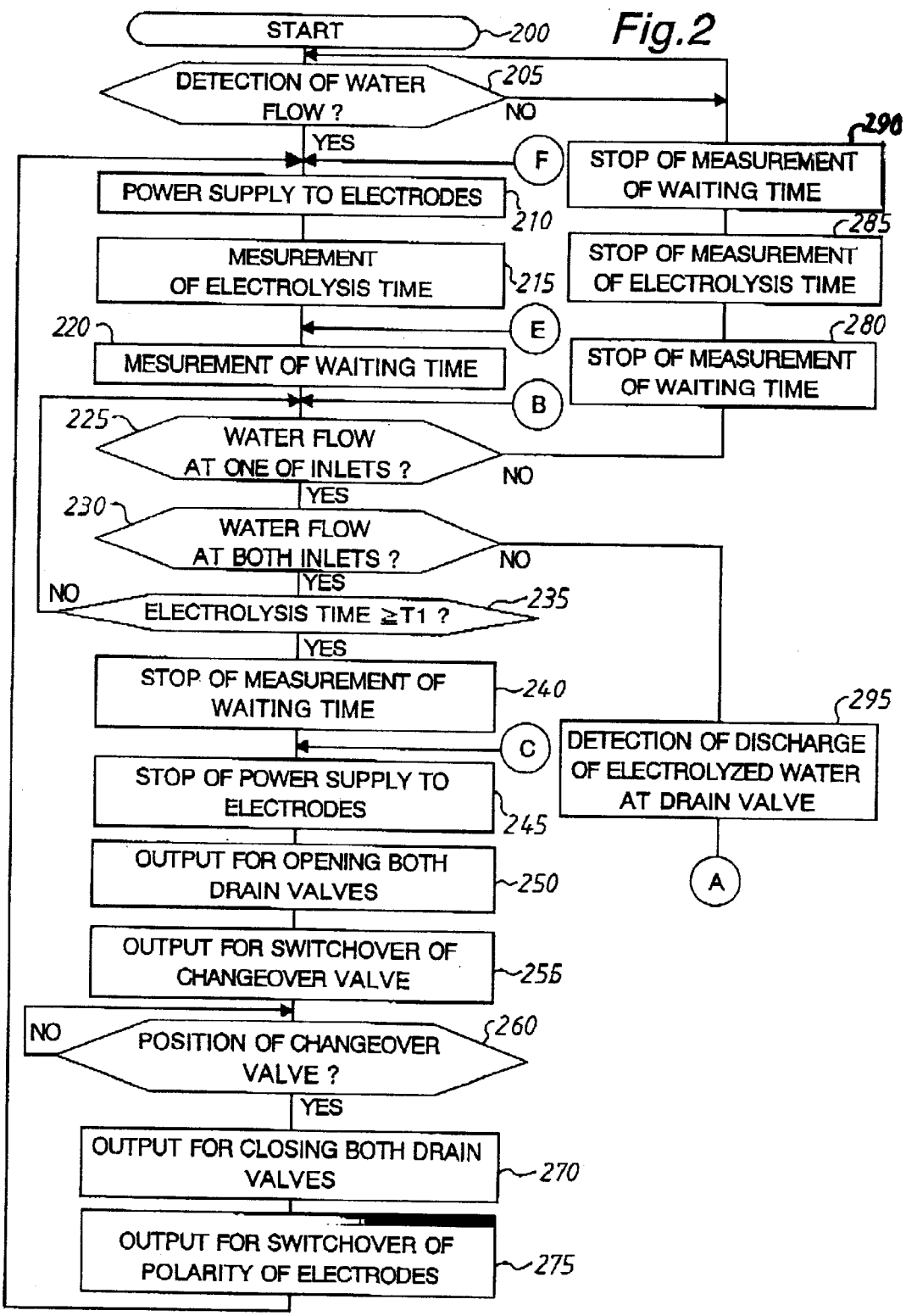
FIG. 2 is a flow chart showing a first part of a control program executed by a microcomputer of an electric control device illustrated in FIG. 1.
Figure 3:
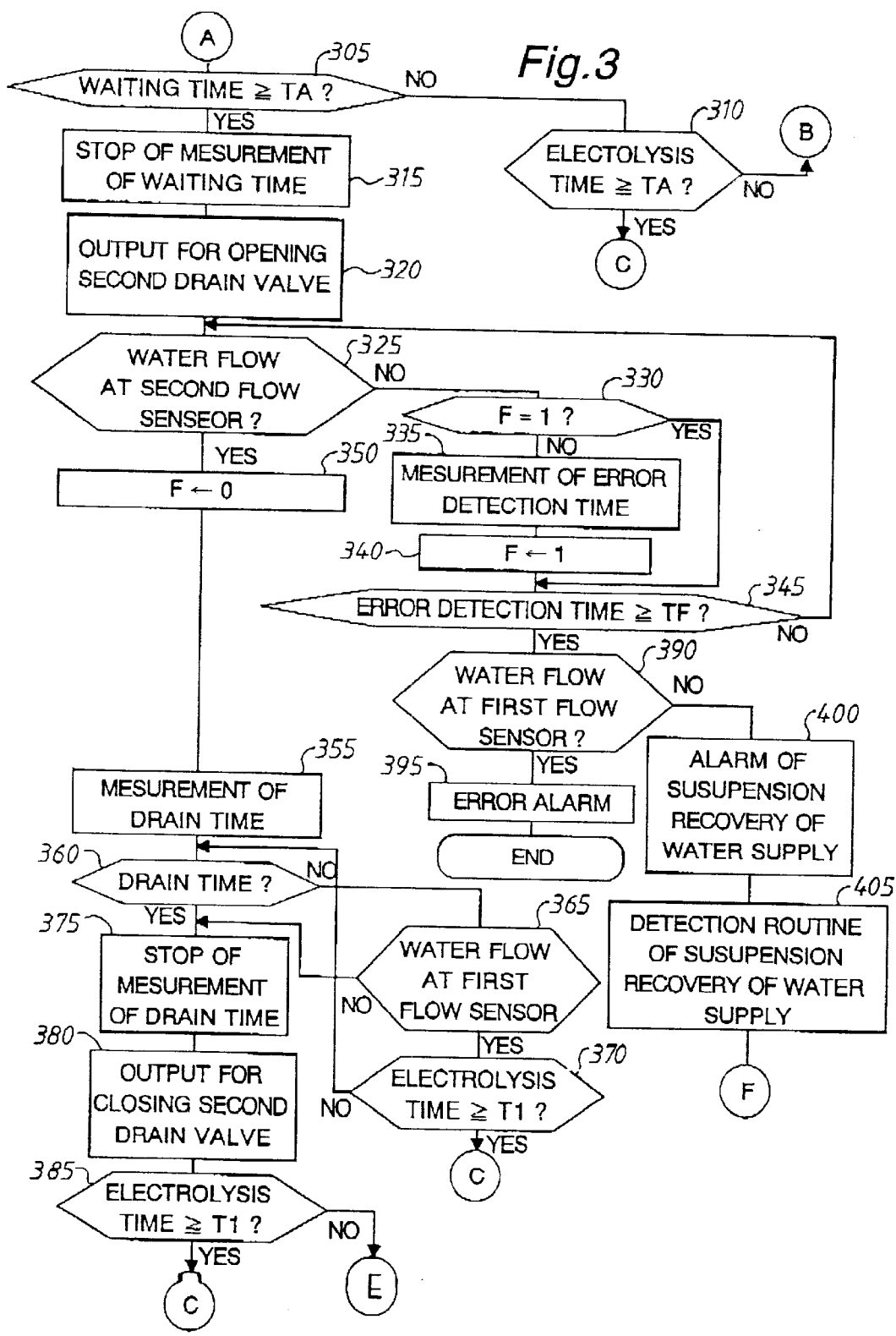
FIG. 3 is a flow chart showing a second part of the control program.
Figure 4:
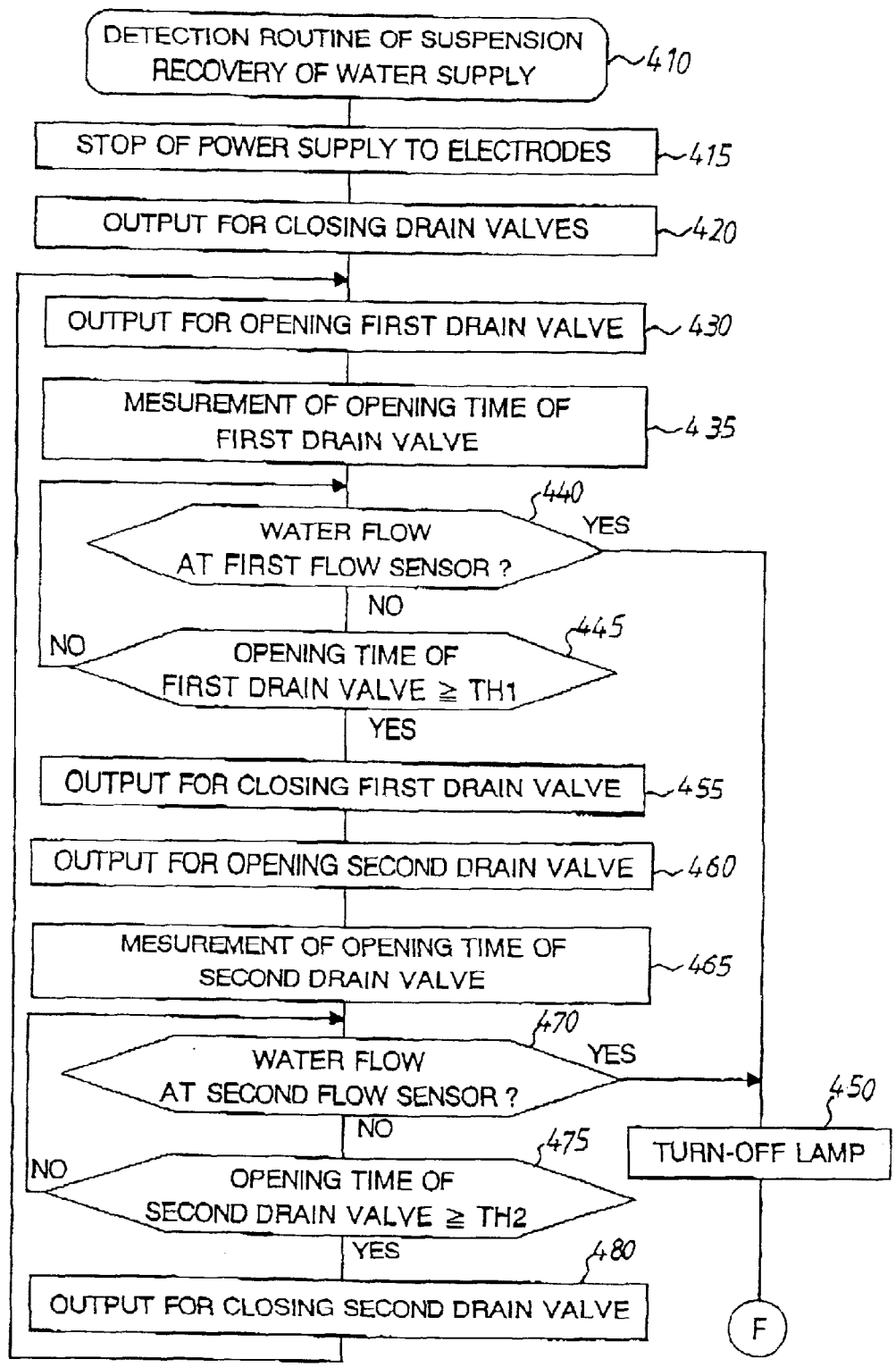
FIG. 4 is a flow chart of a program for detecting recovery of water supply in its suspension.

The electric control device 100 is provided with a main switch 101, a manual changeover switch 102, an indication lamp 103 and an alarm buzzer 104 and includes a microcomputer for executing control programs shown by flow charts in FIGS. 2–4 and output means for issuing open and close signals. The production system of electrolyzed water is operated under control of the computer of control device 100 as described hereinafter.

(1) Operation of the production system in a condition where both the faucets of the discharge conduits:

Assuming that either one of the faucets 43, 44 and either one of the faucets 45, 46 have been opened by a user to discharge alkaline water and acid water during activation of the electrolyzer, the flow quantity sensors 81, 82 are turned on to issue detection signals indicative of the flow of water supplied to the electrolyzer 10. When the main switch 101 of control device 100 is turned on by the user, the computer starts at step 200 to execute the control program shown in FIG. 2 and determines a "Yes" answer at step 205. When the program proceeds to step 210, the computer applies positive and negative DC voltages to the electrodes in a forward direction for electrolysis of the water and causes the program to proceed to step 215. Thus, the computer starts at step 215 to measure an electrolysis time and starts at step 220 to measure an waiting time. When the program proceeds to step 225 after processing at step 220, the computer determines whether the flow of water is detected by the flow quantity sensors 81, 82 or not. In this instance, the flow quantity sensors 81, 82 are maintained in their on-positions, and the computer determines a "Yes" answer at step 225 and causes the program to proceed to step 230. At step 230, the computer determines whether both the flow quantity sensors 81, 82 are maintained in their on-positions or not. If the answer at step 230 is "Yes", the program proceeds to step 235 where the computer determines whether the electrolysis time is more than a predetermined time T1 or not. In this embodiment, the predetermined time T1 is defined to represent a period of time (about 10 minutes) during which the electrolysis performance of electrolyzer 10 tends to decrease due to scale adhered to the electrodes 14, 15. As the electrolysis time at this stage is still less than the predetermined time T1, the computer determines a "No" answer at step 235 and returns the program to step 225. Thereafter, the computer repeats processing at step 225, 230 and 235 until the electrolysis time becomes more than the predetermined time T1 so that the alkaline water and acid water are discharged through the discharge conduits 41, 42, respectively.

When the electrolysis time becomes more than the predetermined time T1, the computer determines a "Yes" answer at step 235 and causes the program to proceed to step 240. Then, the computer stops temporarily the measurement of the waiting time at step 240 and executes processing at step 245 to 275 for switching over the position of the changeover valve 50 and the direction of DC voltages applied to the electrodes 14, 15 thereby to prevent a decrease of the electrolysis performance caused by scale adhered to the electrodes 14, 15.

In the processing at step 245 to 275, the computer stops temporarily the supply of DC voltages to the electrodes 14, 15 at step 245, outputs at step 250 an open signal for opening both the drain valves 71, 72 at step 250 and outputs at step 255 a signal for switching over the changeover valve 50 from its first position to its second position or vice versa. Subsequently, the computer determines at step 260 whether the changeover valve 50 has been switched over or not. If the answer at step 260 is "Yes" the program proceeds to step 270 where the computer outputs a close signal for closing both the drain valves 71, 72 and causes the program to proceed to step 275. At step 275, the computer inverts the supply direction of DC voltages to the electrodes 14, 15 and returns the program to step 210 to repeat the foregoing processing.

Figure 5:
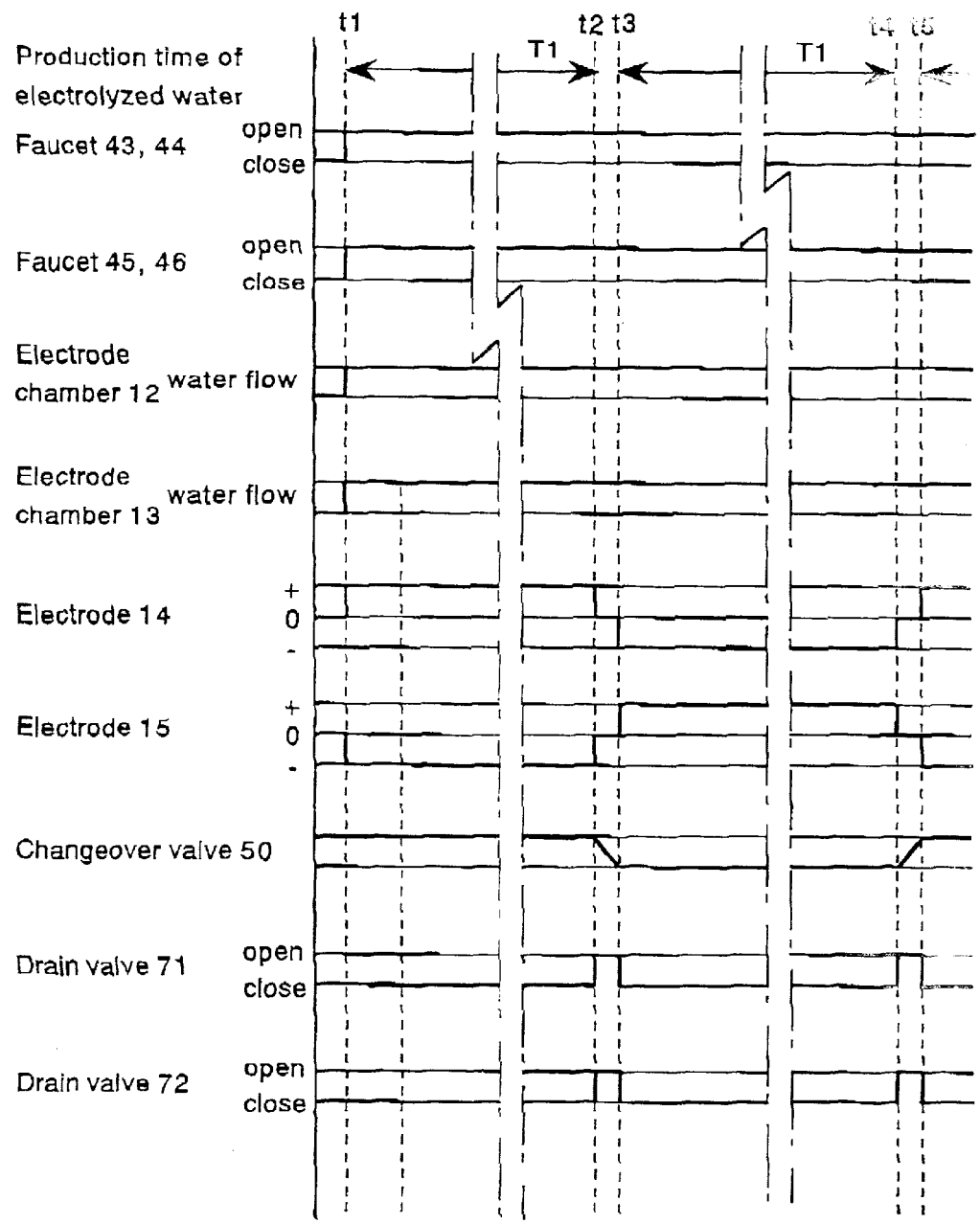
FIG. 5 is a time chart showing an operation mode of the production system of electrolyzed water shown in FIG. 1.

The foregoing operation is illustrated by a time chart in FIG. 5. That is to say, the electrodes 14, 15 are applied with positive and negative DC voltages when the faucets 43, 44 and 45, 46 are opened at a time t1. In this instance, the electrodes 14, 15 act as an anode and a cathode, respectively.

Upon lapse of a predetermined time T, the computer stops the supply of DC voltages to the electrodes 14, 15 at a time t2, activates the electric motor (not shown) to switch over the position of changeover valve 50 and maintains both the drain valves 71, 72 in their open positions in a period of time during which the changeover valve 50 is switched over at a time t3. When the changeover valve 50 has been switched over at the time t3, the electrodes 14, 15 are applied with negative and positive DC voltages under control of the computer. Thus, the electrodes 14, 15 act as a cathode and an anode respectively to effect electrolysis of the supplied water. When the predetermined time T1 further lapses from the time t3, the same operation as that at the time t2 is effected at a time t4. In such an instance, the position of changeover valve 50 is switched over, and the supply direction of DC voltages to the electrodes 14, 15 is switched over to the forward direction to restart electrolysis of the supplied water at a time 5. Thus, the alkaline water and acid water are discharged through the discharge conduits 41 and 42 except for the period during which the changeover valve is switched over.

Assuming that all the faucets 43, 44 and 45 and 46 have been closed after the faucet 43 or 44 and 45 or 46 were opened, the flow quantity sensors 81, 82 are turned off, and the computer determines a "No" answer at step 225. In such an instance, the computer causes the program to proceed to step 280 and stops the supply of DC voltages to the electrodes 14, 15 at step 280. Subsequently, the computer stops the measurement of the electrolysis time at step 285 and stops the measurement of the waiting time at step 290. Thereafter, the computer returns the program to step 205 to monitor whether the flow quantity sensors 81, 82 are opened or not. With the foregoing operation, the production system of electrolyzer A is deactivated to stop electrolysis of the supplied water and to stop discharge of the electrolyzed water.

Figure 6:
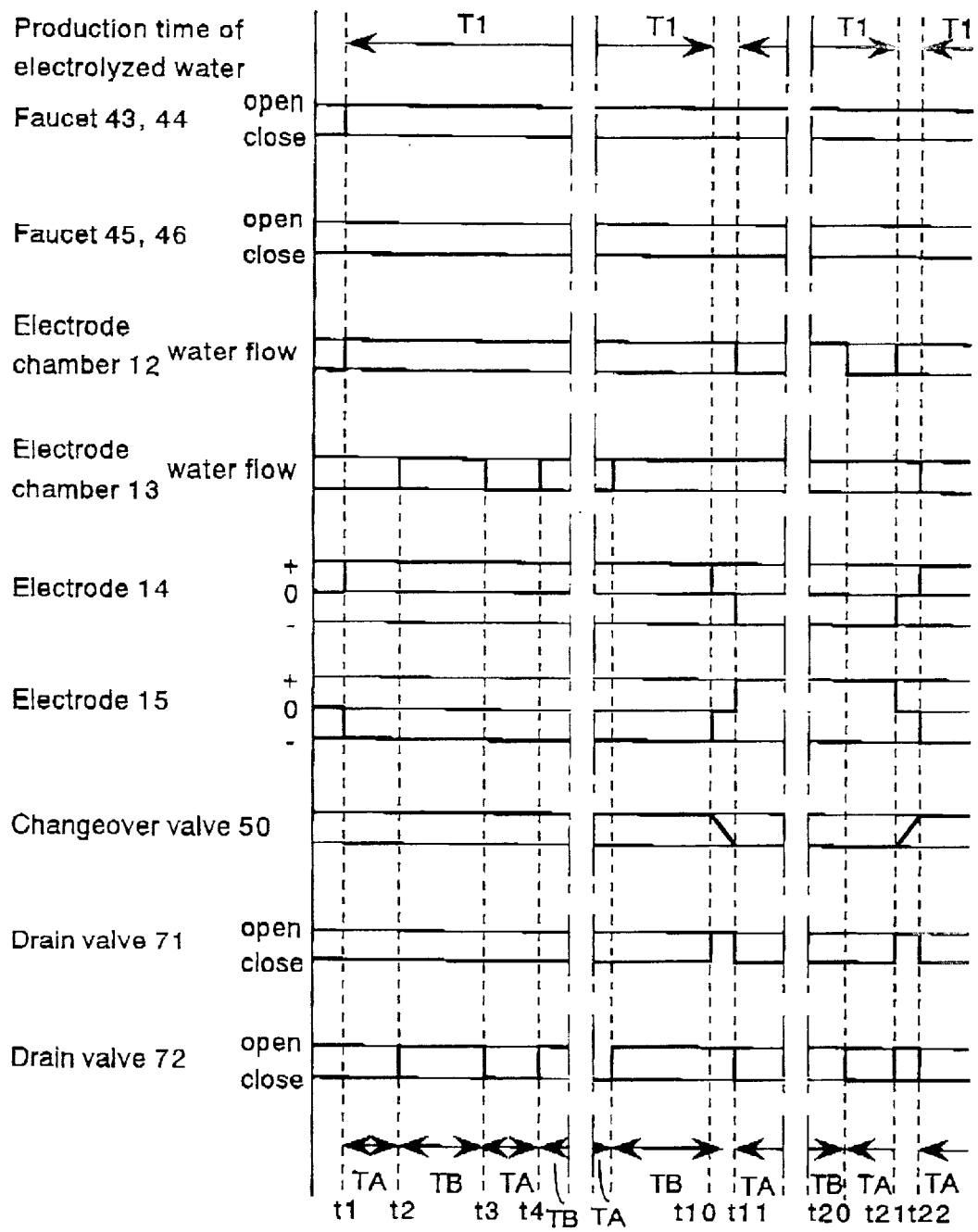
FIG. 6 is a time chart showing another operation mode of the production system of electrolyzed water shown in FIG. 1.

(2) Operation of the production system of electrolyzed water in a condition where only one of the faucets of the discharge conduits:

Assuming that either one of the faucets 43, 44 or both the faucets 43, 44 has been opened to discharge only the acid water in a condition where the changeover valve 50 is retained in its first position, the flow quantity sensor 81 is turned on. Thus, the computer determines a "Yes" answer at step 205 of FIG. 2 and executes processing at step 210, 215, 220 and 225 as in the same manner described above for applying the DC voltages to the electrodes 14, 15 and for measuring the electrolysis time and waiting time. (see a time t1 shown in FIG. 6) Thereafter, die computer causes the program to proceed to step 230 for determining whether both the flow quantity sensors 81 and 82 are turned on or not.

At this stage, the faucets 43, 44 are opened, the faucets 45, 46 are retained in their closed positions, and the drain valves 71, 72 are retained in their closed positions. Thus, the flow quantity sensor 81 is turned on while the flow quantity sensor 82 is turned off. As a result, the computer determines a "No" answer at step 230 and causes the program to proceed to step 295. At step 295, the computer discriminates the sensors 81 and 82 respectively turned on and off to determine the drain valve 71 on the drain conduit 61 bifurcated from the discharge conduit 41 opened at its faucets 43, 44 and the drain valve 72 on the drain conduit 62 bifurcated from the discharge conduit 42 closed at its faucets 45, 46.

Subsequently, the computer causes the program to proceed to step 305 shown in FIG. 3 and determines at step 305 whether the waiting time is more than a standard waiting time TA or not. As the measurement of the waiting time has be just started at step 220, the computer determines a "No" answer at step 305 and determines at step 310 whether the electrolysis time has passed more than the predetermined time T1. As the electrolysis of water has been just started, the computer determines a "No" answer at step 310 and returns the program to step 225. Thereafter, the computer repeats processing at step 225, 230, 295, 305 and 310 until a "Yes" answer is determined at step 310. Thus, the drain valves 71, 72 are maintained in their closed positions to discharge only the acid water through the discharge conduit 41.

During such operation of the production system of electrolyzed water, electrolysis of the supplied water is effected only in one of the electrode chambers in a condition where either the faucets 43, 44 or 45, 46 are opened while the other faucets are maintained in their closed positions and where both the drain valves 71, 72 are closed. As a result an amount of gas is generated and bubbled due to the water retained in one of the electrode chambers during electrolysis of the water in the other electrode chamber, and the pH of electrolyzed water in the electrode chamber becomes excessive or too small. Accordingly, in the foregoing process, the standard waiting time TA is determined (for example, in about 10 seconds) taking into account a period of time during which the gas is generated and bubbled in the electrode chamber.

In addition the standard waiting time TA is determined to be shorter than the predetermined time T1 during which the electrolysis performance is decreased due to scale adhered to the electrodes.

Since the standard waiting time TA is determined as described above, the computer normally determines a "Yes" answer at step 305 prior to determine a "Yes" answer at step 310 and causes the program to proceed to step 315. Thus, the computer stops the measurement of the waiting time at step 315 and outputs at step 320 an open signal for opening the drain valve 72 at a time t2 shown in FIG. 6. With such processing at step 320, the drain valve 72 is opened to discharge the water retained in the electrode chamber 13 through the drain conduit 62, and the water retained in the electrode chamber 13 is diluted by fresh water supplied from the inlet conduit 22.

When the program proceeds to step 325, the computer determines whether the flow quantity sensor 82 is turned on or not. As the flow quantity sensor 82 is still maintained in its off-position at a time immediately after the drain valve 72 was opened, the computer determines a "No" answer at step 325 and determines at step 330 whether a flag F for error detection is "1" or not. As the flag F is set as "0" at initialization of the program when the production system was activated, the computer determines a "No" answer at step 330 and causes the program to proceed to step 335 for measuring a detection time of an error in the production system.

When the program proceeds to step 340, the computer sets the flag F to "1" and determines at step 34 whether the error detection time has passed more than a standard error detection time TF or not. At a time immediately after start of the measurement of the error detection time, the computer determines a "No" answer at step 345 and returns the program to step 325. Thereafter, the computer repeats processing at step 325 to 345 until a "Yes" answer is determined at step 325 and 345.

In this embodiment, the standard error detection time TF is determined taking into account a period of time during which the flow quantity sensors are turned on after the corresponding drain valves were opened. When the passages between the drain valves 71, 72 and changeover valve 50 each are in a normal condition, the flow sensors are turned on before die error detection time becomes more that the standard error detection time TF. Thus, the computer normally determines a "Yes" answer at step 325 and causes the program to proceed to step 350. Subsequently, the computer resets the flag F to "0" at step 350 and initiates at step 355 to measure a drain time during which the water retained in the electrode chamber 13 is discharged after the drain valve was opened at step 320.

When the program proceeds to step 360, the computer determines whether the drain time has passed more than the standard drain time TB or not. As the drain time is still less than the standard drain time TB at a time immediately after the flow quantity sensor 82 has been turned on, the computer determines a "No" answer at step 360 and causes the program to proceed to step 365 for determining whether the flow quantity sensor 81 has been turned on or not. The processing at step 365 is executed to determine whether or not only the acid water is still discharged in a condition where the faucets 43, 44 are opened. As the condition of the faucets 43, 44 and 45, 46 are unchanged at this stage, the computer determines a "Yes" answer at step 365 and causes the program to proceed to step 370 for determining whether the electrolysis time has passed more than the predetermined time T1 or not. At this stage immediately after the electrolysis of the water has been started, the computer determines a "No" answer at step 370 and returns the program to step 360. Thereafter, the computer repeats the foregoing processing until a "Yes" is determined at step 360 or a "No" is determined at step 365. In this embodiment, the standard drain time TB is determined taking into account a period of time during which the water retained in the electrolyzer 10 is discharged immediately before an amount of gas is generated and bubbled in the electrode chamber.

When the drain time has passed more than the standard drain time in a condition where the condition of faucets 43, 44 and 45, 46 is unchanged, the computer determines a "Yes" answer at step 360 and causes the program to proceed to step 375. Then, the computer stops the measurement of the drain time at step 375 and outputs at step 380 a close signal for closing the drain valve 72 at a time t3 shown in FIG. 6. At the following step 385, the computer determines whether the electrolysis time has passed more than the predetermined time T1 or not. In a condition where any scale does not adhere to the electrodes, the computer determines a "No" answer at step 385 and returns the program to step 220 shown in FIG. 2. Thereafter if the condition of faucets 43, 44 and 45, 46 is unchanged, the computer starts to measure the waiting time at step 220, outputs at step 320 an open signal for opening the second drain valve 72 upon lapse of the standard waiting time TA and outputs at step 380 a close signal for closing the second drain valve 72 upon lapse of the standard drain time TB.

Assuming that either one of the faucets 45, 46 or both the faucets 45, 46 has been opened in a condition where the faucets 43, 44 are maintained in their open positions, the computer causes the second drain valve 72 to intermittently open and close. In this instance, the second flow quantity 82 is turned on when the second drain valve 72 is opened and is turned off when the second drain valve 72 is closed during the waiting time. This means that the second flow quantity sensor 82 is turned on when the faucets 45, 46 of second discharge conduit 42 are opened in a condition where the second drain valve 72 is maintained in its closed position during the waiting time.

When the above condition is detected, the computer causes the second drain valve to intermittently open and close and to maintain the second drain valve in its closed position. In other words, when a "Yes" answer is determined at step 230 while the processing at step 225, 230, 295, 305 and 310 is repeated during the waiting time, the computer repeats the processing at step 235, 225 and 230 without executing the processing at step 320 for opening the second drain valve so that both the drain valves are maintained in their closed positions. In this respect, it is noted that in the conventional production system of electrolyzed water, both the flow quantity sensors 81, 82 are turned on as the second drain valve 72 is maintained in its open position in a condition where the electrolyzed water is being discharged only through the discharge conduit 41. For this reason, even when the faucets 45, 46 of discharge conduit 42 are opened, the flow of electrolyzed water discharged through the conduit 42 may not be detected. As a result, the second drain valve 72 is maintained in its open position. This causes shortage of the amount of electrolyzed water discharged through the conduit 42. In contrast with such a situation in the conventional production system, a sufficient amount of electrolyzed water is discharged through the conduit 42 in this embodiment.

When the electrolysis time of the water becomes more than the predetermined time T1, the computer determines a "Yes" answer at step 310, 370 or 385 and returns the program to step 245. In such an instance, the computer executes the processing at step 245 to 275 for switching over the supply direction of DC voltages to the electrodes and the position of changeover valve 50 and returns the program to step 210.

Thus, even when the second drain valve 72 is maintained in its closed position during the standard waiting time or maintained in its open position during the standard drain time in a condition where either one of the faucets 43, 44 or both the faucets 43, 44 is opened or either one of the faucets 45, 46 or both the faucets 45, 46 is opened, both the drain valves 71, 72 are opened by the processing at step 250, and simultaneously the changeover valve 50 is switched over by the processing at step 255 after the supply of DC voltages to the electrodes was stopped by the processing at step 245. Subsequently, the drain valves 71, 72 are closed after the changeover valve 50 was switched over. (see the processing at step 260, 270 and times t10–t11, t21–t22 in FIG. 6)

Accordingly, when the electrolysis time of the water has lapsed more than the predetermined time T1 in a condition where either the alkaline water or acid water is discharged while the other water is intermittently discharged, both the drain valves 71, 72 are opened, and the position of changeover valve 50 and the supply direction of DC voltages to the electrodes are switched over to prevent a decrease of the electrolysis performance of the electrodes. Thereafter, the waiting time is measured irrespectively of the condition of drain valves 71, 72. (see processing at step 220 executed after processing at step 310, 370 and 385)

When the second drain valve 72 is maintained in its closed position in a condition where only the faucets 43, 44 are maintained in their open positions, the computer repeats the processing at step 225, 20, 295, 305, 310. Accordingly, when the faucets 43, 44 are closed during such a period of time, the computer determines a "No" answer at step 225 and stops the production of electrolyzed water by processing at step 280, 285 and 290.

On the other hand, when the second drain valve 72 is maintained in its open position in a condition where only the faucets 43, 44 are maintained in their open positions, the computer repeats processing a at step 360, 365 and 370.

Accordingly, when the faucets 43, 44 are closed during such a period of time, the computer determines a "No"

answer at step 365, stops the measurement of the drain time by processing at step 375, and closes the second drain valve 72 by processing at step 380. Subsequently, the computer executes processing at step 385, 220, 225 and determines a "No" answer at step 225. Thus, the computer stops the production of electrolyzed water by processing at step 280, 285 and 290.

(3) Detection of clog in the conduits and trouble of the drain valves:

In the occurrence of trouble of the drain valve 72 or clog in the discharge conduit 42 and drain conduit 62, the second flow quantity sensor 82 may not be tuned on after the second drain valve 72 was opened by processing at step 320. Accordingly, the computer repeats execution of the processing at step 325 to 345 and determines a "Yes" answer at step 345 when the error detection time measured at step 335 becomes more than the standard error detection time TF. When a "Yes" answer is detected at step 345, the computer causes the program to proceed to step 390 and determines at step 390 whether the first flow quantity sensor 81 is still maintained in its on-position or not. If at this stage, there occurs trouble in the second drain valve 72 or clog in the discharge conduit 42 and drain conduit 62 in a normal supply condition of the water, the second flow quantity sensor 82 may not be turned on while the first flow quantity sensor 82 is turned on. Accordingly, the computer determines a "Yes" answer at step 390 and activates the alarm buzzer 104 at step 395 to inform the use of an abnormal condition.

(4) Detection of suspension of water supply:

In the occurrence of suspension of water supply, both the flow quantity sensors 81 and 82 are turned off. Accordingly, the computer determines a "Yes" answer after determined a "No" answer at step 325 of FIG. 3 and determines a "No" answer at step 390. When the program proceeds to step 400, the computer puts on the lamp 103 to inform the user of the suspension of water supply. Subsequently, the computer executes at step 405 a detection routine of recovery of water supply shown by a flow chart in FIG. 4.

When started to execute the detection routine of recovery of water supply, the computer stops the supply of DC voltages to the electrodes 14, 15 at step 415. Thereafter, the computer closes the drain valves 71, 72 temporarily by processing at step 420 and opens the first drain valve 71 by processing at step 430. Subsequently, the computer starts at step 435 to measure the opening time of the first drain valve 71.

At the following step 440, the computer determines whether the first flow quantity sensor 81 is turned on or not. As the first flow quantity sensor is still maintained in its off-position immediately after the first drain valve 7a was opened, the computer determines a "No" answer at step 440 and causes the program to proceed to step 445. As the opening time of the first drain valve at this stage is less than a predetermined time TH1, the computer determines a "No" answer at step 445 and returns the program to step 440. Thereafter, the computer repeats execution of the processing at step 440 and 445 to monitor whether the first flow quantity sensor 81 is turned on or not until the supply of water is recovered before lapse of the predetermined time TH1 or the predetermined time TH1 lapses under suspension of the water supply.

In this embodiment, the predetermined time TH1 is defined taking into account a period of time during which the first flow quantity sensor 81 is turned on after the first drain valve was opened in a normal supply condition of the water. Accordingly, when the first drain valve 71 is opened in a condition where the supply of water was recovered, the water is supplied into the inlet conduit 21, and the first flow quantity sensor 81 is turned on upon lapse of the predetermined time TH1. Thus, when a "Yes" answer is determined at step 440 before lapse of the predetermined time TH1, recovery of the water supply is detected by the computer. In his instance, the computer puts off the lamp 103 by precessing at step 450 to inform the user of recovery of the water supply. Thereafter, the computer returns the program to step 210 for controlling discharge of the electrolyzed water in accordance with each condition of the faucets 43, 44 and 45, 46.

If the supply of water is continuously cut off, the computer determines a "No" answer at step 440 and determines a "Yes" answer at step 445 upon lapse of the predetermined time TH1. At the following step 455, the computer outputs a close signal for closing the first drain valve and executes processing at the following step 460, 465, 470, 475 and 480 substantially in the same manner as in the processing at step 430, 435, 440 445 and 455. In such an instance, the computer opens the second drain valve 72 by processing at step 460 and determines at step 470 whether or not the second flow quantity sensor 82 is turned on within the predetermined time TH2 after the second drain valve was opened. When the supply of water is recovered, the computer determines a "Yes" answer at step 470 and puts off the lamp 103 by processing at step 450. If the answer at step 470 is "No", the program proceeds to step 480 where the computer outputs a close signal for closing the second drain valve 72 and returns the program to step 430 for detecting recovery of the water supply.

The foregoing processing is executed by the computer until the supply of water is recovered, and the first and second drain valves are alternately opened for the predetermined times TH1 and TH2 respectively for detecting recovery of the water supply. The alternate operation of the drain valves is useful to prevent deterioration of the durability of the drain valves caused by continual supply of the electric power and to prevent stick of the drain valves.

Although the above description was made to explain a condition where only the faucets 43, 44 were opened to discharge the electrolyzed water through the first discharge conduit 41, the operation of the production system is controlled in a similar manner in a condition where the faucets 45, 46 are opened to discharge the electrolyzed water through the second discharge conduit 42.

What is claimed is:

1. A production system of electrolyzed water including an electrolyzer having a pair of electrode chambers subdivided by a partition membrane and supplied with treatment water from an external water supply source to continuously electrolyze the water for producing alkaline water and acid water;

a pair of discharge conduits connected to the electrode chambers and provided with a faucet at their outlet ends respectively, a pair of drain conduits respectively bifurcated from the discharge conduits at upstream of the faucets and each provided with a dram valve to be opened and closed; and a control circuit including control means for closing the drain valve of the drain conduit bifurcated from the discharge conduit opened at its faucet when either one of the faucets or both the faucets was opened;

wherein the control circuit includes determination means for determining whether or not either one of the faucets was opened while the other faucet is closed so that the electrolyzed water is discharged only through the discharge conduit opened at its faucet, and drain control means for intermittently opening and closing the drain valve of the drain conduit bifurcated from the discharge conduit closed at its faucet in a condition where the electrolyzed water is discharged only through said discharge conduit.

2. A production system of electrolyzed water as claimed in claim 1, wherein said drain control means is arranged to close the drain valve of the drain conduit bifurcated from the discharge conduit closed at its faucet until a first predetermined time lapses in a condition where the electrolyzed water is discharged only through said discharge conduit, to open the drain valve for a second predetermined time when the electrolyzed water is still discharged only through said discharge conduit during the first predetermined time, to close the drain valve for the first predetermined time upon lapse of the second predetermined time and to open the drain valve for the second predetermined time.

3. A production system of electrolyzed water as claimed in claim 1 or 2, wherein a flow passage changeover valve is provided between the electrode chambers of the electrolyzer and the discharge conduits to selectively establish a first connection condition where one of the electrode chambers is connected to one of the discharge conduits while the other electrode chamber is connected to the other discharge conduit and a second connecting condition where one of the electrode chambers is connected to the other discharge conduit while the other electrode chamber is connected to one of the discharge conduits, and wherein the control circuit includes means for switching over the changeover valve from the first connecting condition to the second connecting condition and vice versa when a predetermined condition is satisfied and means for opening both the drain valves until the changeover valve is switched over.

4. A production system of electrolyzed water as claimed in claim 1, wherein the control circuit includes flow detection means for detecting whether or not the water from the external water supply source is being supplied into the electrode chamber communicated with the drain conduit the drain valve of which was opened under control of the drain control means and means for determining suspension of water supply when the flow detection means does not detect the flow of water supplied into the electrode chamber.

5. A production system of electrolyzed water including an electrolyzer having a pair of electrode chambers subdivided by a partition membrane and supplied with water from an external water supply source to continuously electrolyze the water for producing alkaline water and acid water; a pair of discharge conduits connected to the electrode chambers and provided with a faucet at their outlet ends respectively, a pair of drain conduits respectively bifurcated from the discharge conduits at upstream of the faucets and each provided with a drain valve to be opened and closed by the drain valve, a pair of flow detection means for detecting whether the electrode chambers are being supplied with the water or not, and a control circuit including output means connected to the flow detection means to issue an output signal for independently opening and closing the drain valves based on a result of detection of the flow detection means, wherein the control circuit includes drain control means for maintaining a closed condition of the drain valve of the drain conduit communicated with either one of the electrode chambers supplied with the water the flow of which is detected by one of the flow detection means in a condition where both the drain valves are maintained in their closed positions under control of the output means and for intermittently opening tie drain valve of the drain conduit communicated with the other electrode chamber in which the flow of supplied water may not be detected by the flow detection means and further includes means for controlling the output means in such a manner that both the drain valves are maintained in their closed positions when the flow of water supplied into the electrode chambers is detected by both the flow detection means in a condition where the drain valve is intermittently opened and closed.

* * * * *

UNITED STATES PATENT AND TRADEMARK OFFICE
CERTIFICATE OF CORRECTION

PATENT NO.      : 6,391,169 B1
DATED           : May 21, 2002
INVENTOR(S)     : Yasuo Hara et al.

It is certified that error appears in the above-identified patent and that said Letters Patent is hereby corrected as shown below:

<u>Title page,</u>
Item [22], delete "Filed: Apr. 30, 2001" and replace with
-- Filed: September 19, 2000 --

Signed and Sealed this

Third Day of December, 2002

JAMES E. ROGAN
*Director of the United States Patent and Trademark Office*